United States Patent [19]

Koch

[11] 4,377,368
[45] Mar. 22, 1983

[54] ESCAPEMENT MECHANISM
[75] Inventor: Richard L. Koch, Warren, Mich.
[73] Assignee: F. Jos. Lamb Company, Warren, Mich.
[21] Appl. No.: 215,093
[22] Filed: Dec. 10, 1980
[51] Int. Cl.³ .............................................. B65G 47/26
[52] U.S. Cl. .................................... 414/748; 221/251; 221/298; 193/40
[58] Field of Search ................ 221/298, 251; 193/32, 193/40; 414/745, 748, 224

[56] References Cited

U.S. PATENT DOCUMENTS

| | | | |
|---|---|---|---|
| 2,071,770 | 2/1937 | Shield | 414/748 |
| 2,299,835 | 10/1942 | Mayer | 221/251 |
| 3,416,706 | 12/1968 | Gross | 221/251 |
| 3,446,367 | 5/1969 | Anderson | 414/748 |
| 3,602,403 | 8/1971 | Klem | 221/251 |
| 3,820,648 | 6/1974 | Halvorsen | 221/251 |
| 4,062,438 | 12/1977 | Cottrell | 414/748 |
| 4,147,260 | 4/1979 | Osaka et al. | 414/748 |
| 4,228,901 | 10/1980 | Watzka et al. | 221/251 |
| 4,348,019 | 9/1982 | Stievenart et al. | 221/251 |

Primary Examiner—Richard A. Bertsch
Attorney, Agent, or Firm—Barnes, Kisselle, Raisch, Choate, Whittemore & Hulbert

[57] ABSTRACT

An escapement having a pair of retractable stops spaced apart lengthwise of a downwardly inclined track along which workpieces are conveyed. The upstream stop is supported for pivotal movement lengthwise of the track so that its leading end is adapted to engage in the cleavage space between a pair of abutting workpieces when the stop is extended regardless of whether the cleavage space is located in exactly the same position for each pair of successive workpieces.

8 Claims, 6 Drawing Figures

ESCAPEMENT MECHANISM

This invention relates to a workpiece escapement mechanism for gravity conveyors.

The art of metering workpieces in gravity chuting conveyors is well advanced. In the past conveying systems of this type have been designed for conveying only one size workpiece. Consequently, it has been a relatively easy matter to design and build an escapement device for metering a single size part. Gravity chuting conveyors are now being designed and built for conveying a whole family of similarly shaped workpieces of different sizes. Gear blanks of different diameters, for example, are one form of workpiece that is now being conveyed in a single gravity chuting system. Escapement devices as heretofore designed and constructed are not readily adapted for use with similarly shaped workpieces which vary substantially in size.

The primary object of this invention is to provide an escapement mechanism adapted to meter workpieces which differ in size without requiring any adjustment or other alteration of the mechanism.

A more specific object of this invention is to provide an escapement mechanism which automatically adjusts itself to accommodate workpieces of various sizes that are being simultaneously conveyed in a gravity chuting system.

More specifically, the invention contemplates an escapement mechanism which includes two retractable workpiece stops spaced apart lengthwise of the conveyor track. The downstream stop is adapted to engage and hold back the leading workpiece of a queue of workpieces and release the workpiece when it is retracted. The upstream stop is supported for limited pivotal movement in an arc extending generally lengthwise of the conveyor track so that, when it is extended, it can be pivoted freely, as necessary, to engage between a pair of upstream workpieces in the cleavage space therebetween.

Other objects, features and advantages of the present invention will become apparent from the following description and accompanying drawings, in which.

Figure 1:
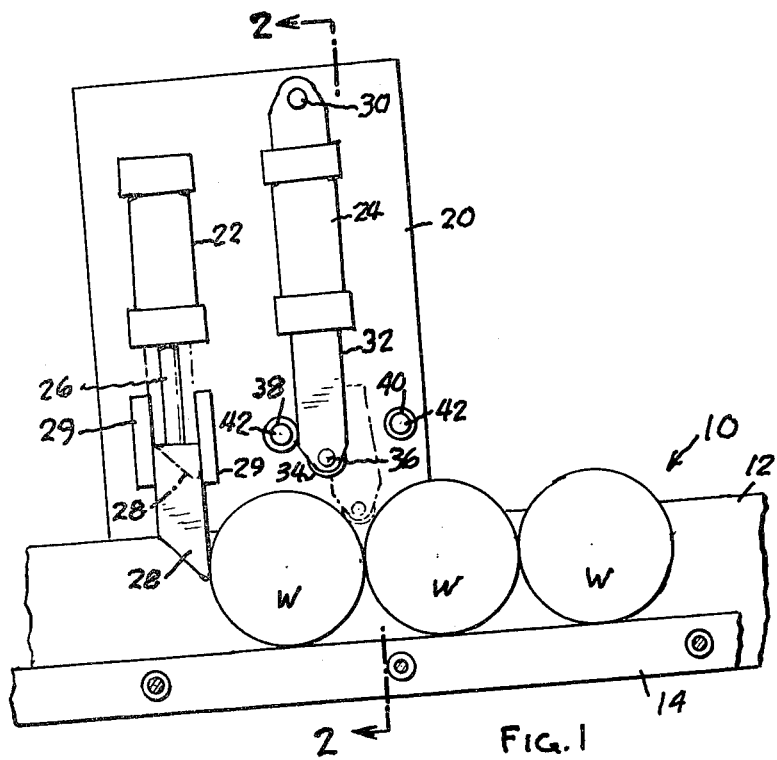
FIG. 1 is a fragmentary side elevational view of a gravity chuting system employing the escapement mechanism of the present invention.
Figure 2:
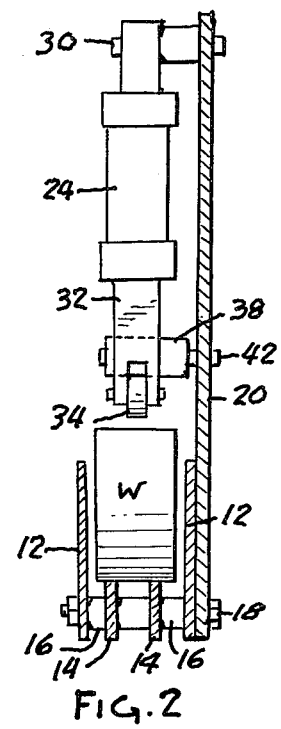
FIG. 2 is a sectional view taken along the line 2—2 in FIG. 1.

In FIGS. 1 and 2 there is illustrated a gravity conveyor guideway assembly in the form of a track 10 having side rails 12 and support rails 14 secured together in spaced apart relation by spacers 16 and bolt and nut assemblies 18. The bolt and nut assemblies 18 also support a mounting plate 20 on track 10. A pair of fluid cylinders 22,24 are supported on mounting plate 20. The downstream cylinder 22 is rigidly secured on plate 20 and has fixed to its piston rod 26 a stop in the form of a sear 28. Sear 28 is slidably arranged between guides 29 and is adapted to be extended and retracted between the full line and broken line positions shown in FIG. 1 when cylinder 22 is actuated. When sear 28 is extended, it is adapted to engage and retain the first workpiece W in a queue of such workpieces on the downwardly inclined support rails 14. When sear 28 is retracted to the broken line position, it clears workpiece W and permits it to roll down the track.

The upstream cylinder 24 is pivotally supported on mounting plate 20 as by a pin 30. A block 32 is fixedly connected to the rod 33 of cylinder 24 and is adapted to reciprocate therewith. The lower end of the block 32 is rounded and centrally slotted. A roller 34 is journalled in the slotted end of block 32 by a pin 36. The angular displacement of block 32 and roller 34 is limited in a downstream direction by a roller stop 38 and in an upstream direction by a roller stop 40. These roller stops are journalled on pins 42.

With the cylinders 22,24 actuated to the position shown in solid lines in FIG. 1 the leading workpiece W on track 10 engages sear 28 and the forward movement of all of the workpieces is thereby arrested. When it is desired to release the leading workpiece a pneumatic circuit (hereinafter described) is actuated to retract sear 28 to the broken line position and simultaneously project block 32 downwardly. When block 32 is extended downwardly, roller 34 engages the peripheral surfaces of the first two workpieces in the cleavage space 45 between them so that block 32 swings to the broken line position shown in FIG. 1. Thereafter, as sear 28 clears the leading workpiece, block 32 swings to the left into engagement with roller stop 38 to prevent further advance of the row of workpieces. The pneumatic circuit is then again actuated to extend sear 28 downwardly to the solid line position and thereafter retract block 32 to the solid line position and thereby permit the row of workpieces to index forwardly to the position shown in FIG. 1.

Figure 3:
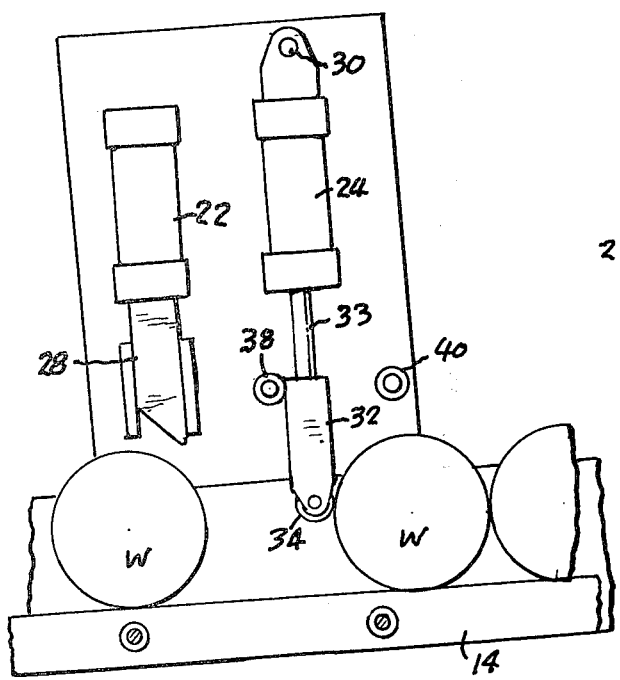
FIGS. 3, 4 and 5 are fragmentary side elevational views illustrating the mode of operation of the mechanism.
Figure 4:
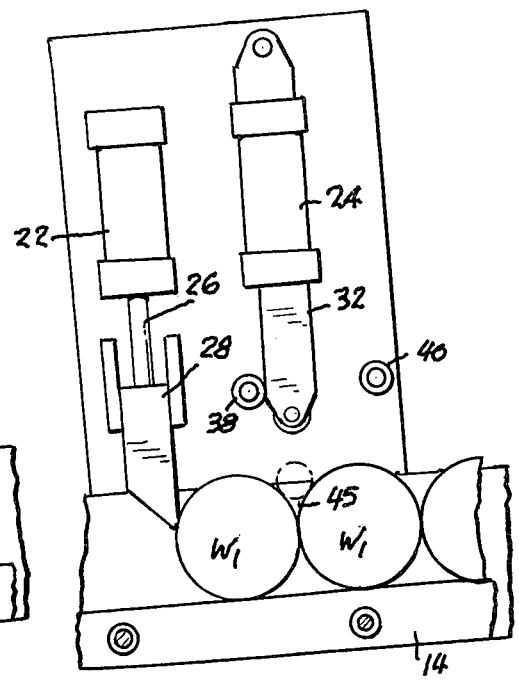

In FIG. 4 the workpieces W-1 have a smaller diameter than the workpieces W shown in FIGS. 1 through 3. However, even with the smaller size workpieces, the roller 34 will seek a position in the cleavage space 45 between the leading and next successive workpiece so that the arrangement operates in substantially the same manner as illustrated in FIGS. 1 through 3 to meter the workpieces from the guideway one at a time.

Figure 5:
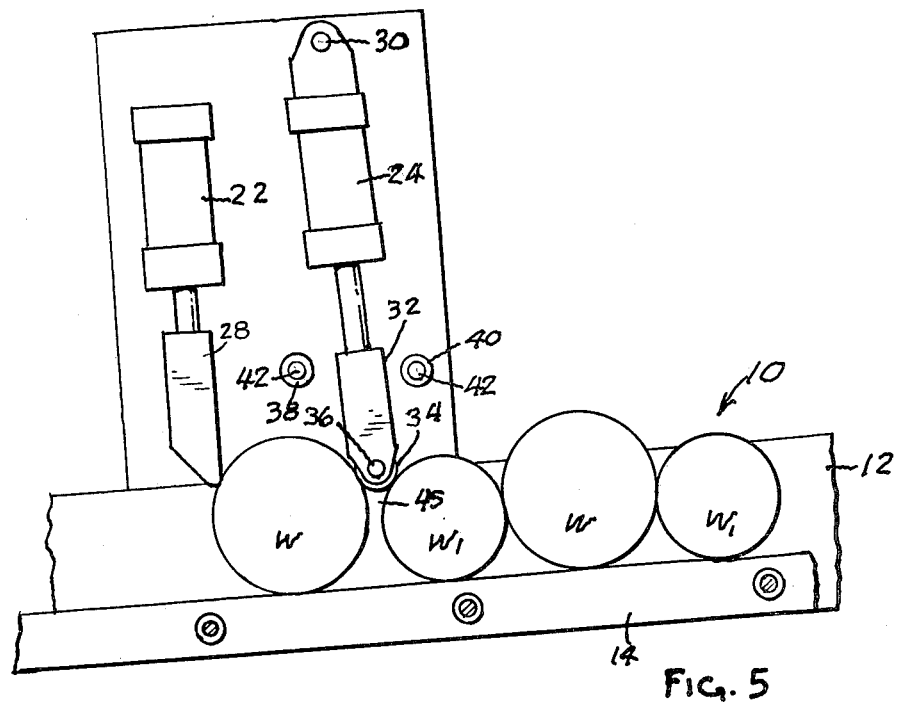

FIG. 5 shows the same arrangement as illustrated in the previous figures but with a mix of large and small workpieces in the guideway. The pivotal support of cylinder 24, its location upstream from cylinder 22 and the provision of the stop rollers 38,40 is substantially the same as in the previous embodiment and the arrangement operates in substantially the same way. As long as cylinder 24 is free to swing upstream and downstream so that the roller 34 engages in the cleavage space 45 between the first two workpieces, the arrangement will meter the workpieces from the guideway one at a time in response to the alternate actuation of the cylinders 22,24.

Figure 6:
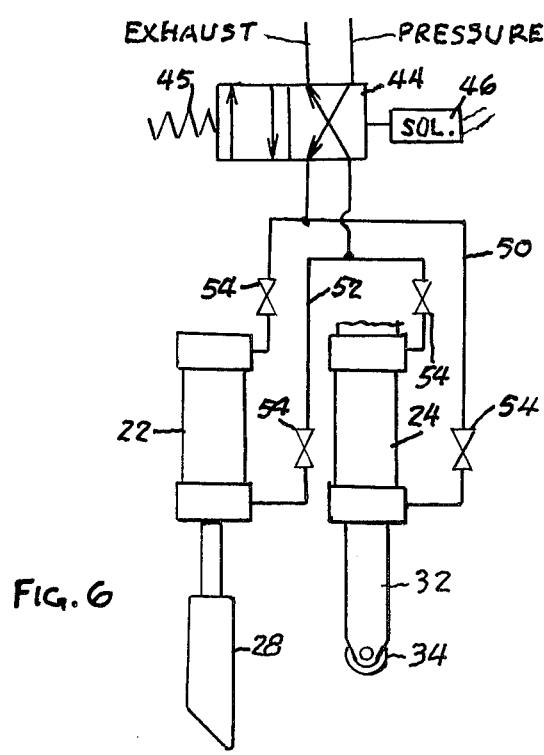
FIG. 6 is a diagrammatic view of a fluid system for operating the escapement mechanism.

A typical pneumatic circuit for operating cylinders 22,24 is illustrated in FIG. 6. This circuit includes a four-way valve 44 operated by a solenoid 46 and a return spring 48. A conduit 50 connects the head end of cylinder 22 with the rod end of cylinder 24. Likewise, a conduit 52 connects the rod end of cylinder 22 with the head end of cylinder 24. These conduits are connected to the ports of valve 44 so that in one position of the valve spool sear 28 is extended and block 32 is extended. If desired, needle valves or other suitable flow control orifices 54 may be arranged in the conduits 50,52 which lead to the opposite ends of the two cylinders to control their speed and the timing of their motions relative to each other. Solenoid 46 is adapted to be energized by any suitable switch in the chuting system which operates in response to the desired timing of the metering mechanism illustrated.

When the workpieces are circular and adapted to roll on the track, it is desirable to orient cylinders 22,24 vertically as illustrated. With workpieces of different shape a preferred orientation of the cylinders may be horizontal or inclined. Likewise, the escapement device of this invention is not limited to use with circular workpieces; it is only necessary that, when the workpieces are abutting in a queue, a cleavage space between them is formed for entry of the roller 34. If desired, cylinders 22,24 can be spaced apart to meter a plurality of workpieces during each cycle of operation.

I claim:

1. A metering device for workpieces comprising a downwardly inclined track along which a series of workpieces are adapted to gravitate in succession, the workpieces having a configuration such that, when they are arranged in a row in abutting relation on the track, a cleavage cavity is formed between the successive workpieces which opens in a direction transversely of the track, a stop positioned to engage and arrest the downward movement of the leading workpiece in the track, said stop being retractable to release the leading workpiece and thus permit it to advance downwardly on the track from its arrested position, a second retractable stop spaced upstream on the track from the first stop and positioned so that when extended it projects in a direction transversely of the track into the cleavage cavity between a pair of successive abutting workpieces on the track, said second stop being gravitationally supported on a pivot axis so that it swings freely in a direction generally lengthwise of the track, abutment means for limiting gravitational pivotal movement of the second stop in a downstream direction on the track to arrest movement of the upstream workpiece of said pair when the first stop is retracted and the second stop is extended, said second stop being axially retractable from said cleavage cavity in a direction toward its pivot axis for releasing said upstream workpiece and means for extending and retracting said stops alternately, said abutment means being located so that, when the pivoted stop is engaged therewith in the extended position, it projects in said cleavage cavity and the upstream workpiece of said pair is arrested at a position upstream of its position when arrested by the first stop.

2. A metering device as called for in claim 1 wherein the pivoted stop has a converging leading end portion to facilitate its projection into said cleavage space.

3. A metering device as called for in claim 1 wherein the pivoted stop has a rounded nose at its leading end.

4. A metering device as called for in claim 1 including a roller journalled on the leading end of the pivoted stop on an axis extending transversely of the track.

5. A metering device as called for in claim 1 wherein the workpieces have a circular periphery and the leading end of the pivoted stop when extended is adapted to engage with and between the converging peripheral surfaces of two successive workpieces.

6. A metering device as called for in claim 1 wherein said abutment means is located such that when the pivoted stop is in engagement therewith the leading end is aligned with said cleavage space so as to enter into the cleavage space when the pivoted stop is extended.

7. A metering device as called for in claim 6 including second abutment means for limiting pivotal movement of the pivoted stop in an upstream direction to prevent the pivoted stop from swinging beyond the desired cleavage space.

8. A metering device as called for in claim 1 wherein the two stops are supported above the track and are adapted to be extended and retracted in a generally vertical direction.

* * * * *